R. J. PARSONS AND T. C. JONES.
MONKEY WRENCH.
APPLICATION FILED JUNE 20, 1919.
1,369,705. Patented Feb. 22, 1921.
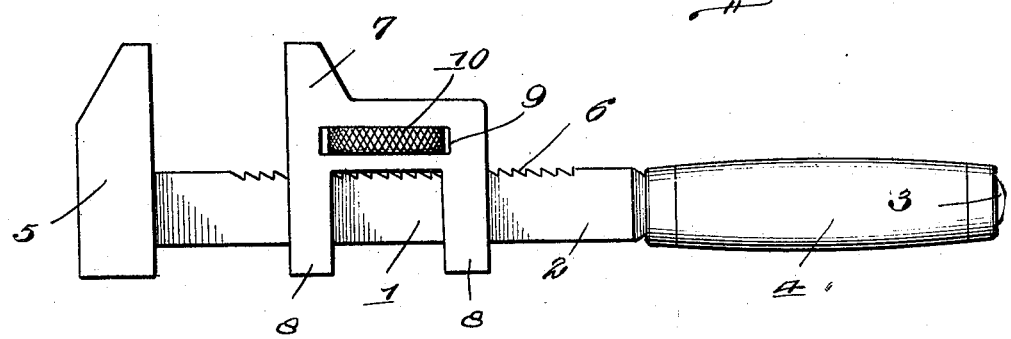
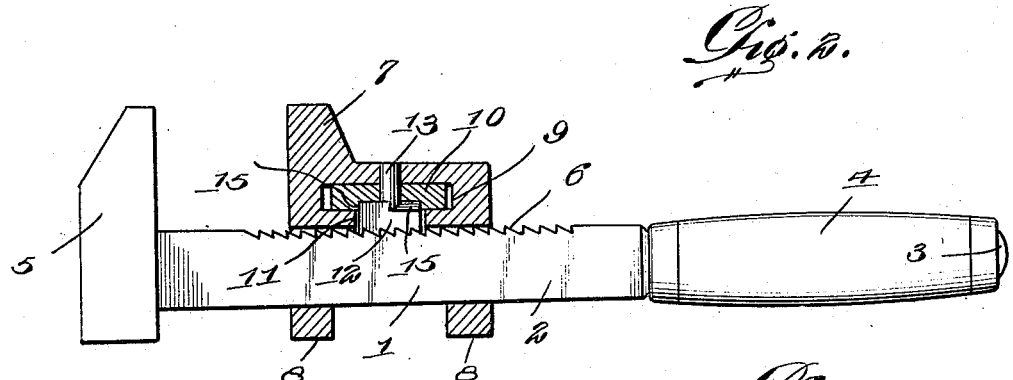
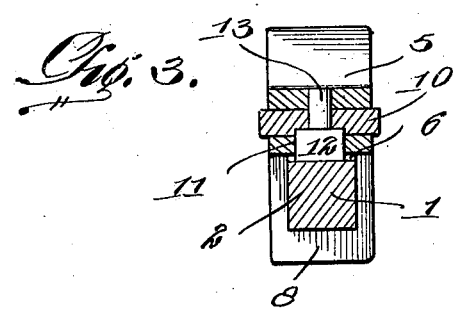
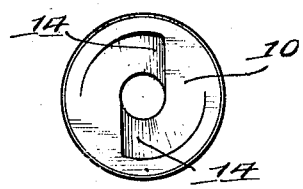
WITNESS:
Fred L. Fox,
INVENTOR.
R. J. Parsons,
BY Tom C. Jones,
Victor J. Evans.
ATTORNEY.

UNITED STATES PATENT OFFICE.

ROSWELL J. PARSONS AND TOM C. JONES, OF KINGSPORT, TENNESSEE.

MONKEY-WRENCH.

1,369,705. Specification of Letters Patent. Patented Feb. 22, 1921.

Application filed June 20, 1919. Serial No. 305,675.

*To all whom it may concern:*

Be it known that we, ROSWELL J. PARSONS and TOM C. JONES, citizens of the United States, residing at Kingsport, in the county of Sullivan and State of Tennessee, have invented new and useful Improvements in Monkey-Wrenches, of which the following is a specification.

This invention relates to improvements in wrenches and the principal object of the invention is to provide a slidable jaw with means for clamping the same in adjusted position by a half turn of a finger actuated disk.

Another object of the invention is to provide means whereby the movable parts of the wrench may be removed by removing the handle of the wrench and sliding the movable jaw over the shank of the wrench.

The invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a side view of the device;

Fig. 2 is a sectional view;

Fig. 3 is a cross section on approximating line passing through the shank of the dog;

Fig. 4 is a view of the disk showing its cam face.

In these views 1 indicates the shank of the wrench which has a portion 2 of square shape in cross section and a rear portion 3 rounded to receive the handle 4. This shank carries the stationary jaw 5 at its end and one face of the square portion is provided with the teeth 6. The movable jaw 7 is provided with the straps 8 which engage the square portion of the shank and this jaw is provided with the recess 9 which receives the finger-operated disk 10. The wall between the recess 9 and the inner face of the jaw is provided with an opening 11 in which is seated the dog 12. This dog is provided with the shank 13 which passes through an opening in the disk 10 and has its extremities seated in a hole in the outer part of the jaw. The disk is provided with a cam face, as shown at 14 and the dog has cam parts 15 for coöperating with said cam face whereby when the disk is rotated, the dog will be moved into engagement with the teeth on the shank. When it is desired to move the jaw 7 the disk is turned to release the dog while the wrench is in a position to cause the dog to move against the disk by the action of gravity and thus free its teeth from those on the shank.

It will thus be seen that when the dog is out of engagement with said teeth the movable jaw may be slid along the shank to the desired position and then by giving the disk a half turn the dog will be moved into engagement with the shank and thus clamp the jaw in adjusted position. When it is desired to remove the parts the handle 4 may be detached from the end of the shank and the movable jaw, with the parts carried thereby, removed from the shank. The handle may be secured to the shank in any desired manner.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

A device of the class described comprising a stationary jaw, a shank of square shape in cross section, teeth on one face of said shank, a movable jaw slidably mounted on the shank and having a recess therein, a disk mounted to rotate in said recess, said disk having portions projecting beyond the sides of the jaw so that it can be rotated by the fingers, a dog carried by the said movable jaw and having its shank forming an axle for the disk and cam parts on said dog and disk for moving the dog into engagement with the teeth on the shank when the disk is rotated.

In testimony whereof we affix our signatures.

ROSWELL J. PARSONS.
TOM C. JONES.